US006979083B2

(12) United States Patent
Kerns, Jr. et al.

(10) Patent No.: US 6,979,083 B2
(45) Date of Patent: *Dec. 27, 2005

(54) EYEGLASS LENS WITH MULTIPLE OPTICAL ZONES HAVING VARYING OPTICAL PROPERTIES FOR ENHANCED VISUALIZATION OF DIFFERENT SCENES IN OUTDOOR RECREATIONAL ACTIVITIES

(75) Inventors: David V. Kerns, Jr., Natick, MA (US); J. Paul Moore, Leawood, KS (US)

(73) Assignee: Peakvision LLC, Needham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/654,598

(22) Filed: Sep. 3, 2003

(65) Prior Publication Data

US 2004/0119940 A1    Jun. 24, 2004

Related U.S. Application Data (63) Continuation-in-part of application No. 09/834,985, filed on Apr. 13, 2001, now Pat. No. 6,623,116, which is a continuation-in-part of application No. 09/469,916, filed on Dec. 22, 1999, now Pat. No. 6,250,759.

(51) Int. Cl.[7] .............................................. G02C 7/10
(52) U.S. Cl. .......................... 351/165; 351/44; 351/163
(58) Field of Search ........................... 351/159, 41, 44, 351/163–165, 168–169

(56) References Cited

U.S. PATENT DOCUMENTS

| | | | |
|---|---|---|---|
| 2,622,984 A | 12/1952 | Peebles et al. | 426/586 |
| 3,034,403 A | 5/1962 | Neefe | 88/54 |
| 3,628,854 A * | 12/1971 | Jampolsky | 351/175 |
| 4,252,421 A | 2/1981 | Foley, Jr. | 351/162 |
| 4,537,479 A | 8/1985 | Shinohara et al. | 351/169 |
| 4,576,453 A | 3/1986 | Borowsky | 351/162 |
| 4,666,640 A | 5/1987 | Neefe | 264/2 |
| 4,669,834 A | 6/1987 | Richter | 351/162 |
| 4,681,412 A | 7/1987 | Lemelson | 351/162 |
| 4,707,236 A | 11/1987 | Borowsky | 204/182 |
| 4,915,495 A | 4/1990 | Takeuchi | 351/49 |
| 5,059,018 A | 10/1991 | Kanome et al. | 351/162 |
| 5,118,178 A | 6/1992 | Tuckman | 351/57 |
| 5,235,358 A | 8/1993 | Mutzhas et al. | 351/163 |
| 5,252,997 A | 10/1993 | Christenbery | 351/49 |
| 5,302,978 A | 4/1994 | Evans | 351/162 |
| 5,414,477 A | 5/1995 | Jahnke | 351/162 |
| 5,432,568 A | 7/1995 | Betz et al. | 351/45 |
| 5,434,630 A | 7/1995 | Bransome | 351/162 |
| 5,444,501 A | 8/1995 | Aloi | 351/44 |
| 5,592,245 A | 1/1997 | Moore et al. | 351/163 |

(Continued)

*Primary Examiner*—Jordan M. Schwartz
(74) *Attorney, Agent, or Firm*—Waddey & Patterson; Mark J. Patterson (57) ABSTRACT

A lens for eyeglasses is provided with two or more optical zones on the lens body having different optical properties that enhance visualization of different scenes, including target objects within the scenes, that are associated with a specific recreational activity such as tennis, skiing, golf, hunting, or fishing. A first optical zone in an upper portion of the lens can be provided with pre-defined focus distance, transmission percentage, and/or transmission spectrum parameters for enhanced visualization of distant scenes associated with the specific recreational activity. A second optical zone in a lower or outer portion of the lens can be provided with different pre-defined focus distance, transmission percentage, and/or transmission spectrum parameters for enhanced visualization of close-in scenes associated with the specific recreational activity.

7 Claims, 4 Drawing Sheets

U.S. PATENT DOCUMENTS

| | | | |
|---|---|---|---|
| 5,617,154 A | 4/1997 | Hoffman | 351/162 |
| 5,662,707 A | 9/1997 | Jinkerson | 623/6 |
| 5,790,226 A | 8/1998 | Pollak | 351/54 |
| 5,864,380 A | 1/1999 | Umeda | 351/169 |
| 5,975,695 A | 11/1999 | Baiocchi et al. | 351/163 |
| 6,056,397 A | 5/2000 | Berlad | 351/44 |
| 6,159,397 A | 12/2000 | Friedman | 264/1 |
| 6,250,759 B1 | 6/2001 | Kerns | 351/165 |
| 6,623,116 B2 | 9/2003 | Kerns | 351/165 |
| 6,631,987 B2 * | 10/2003 | Reichow et al. | 351/163 |
| 6,678,100 B1 * | 1/2004 | Marason et al. | 359/888 |

* cited by examiner

EYEGLASS LENS WITH MULTIPLE OPTICAL ZONES HAVING VARYING OPTICAL PROPERTIES FOR ENHANCED VISUALIZATION OF DIFFERENT SCENES IN OUTDOOR RECREATIONAL ACTIVITIES

This application is a Continuation-In-Part application which claims benefit of U.S. patent application Ser. No. 09/834,985; filed Apr. 13, 2001 now U.S. Pat. No. 6,623,116, entitled "Eyeglass Lens With Multiple Optical Zones Having Varying Optical Properties for Enhanced Visualization of Different Scenes in Outdoor Recreational Activities", which is a continuation-in-part of U.S. patent application Ser. No. 09/469,916 filed Dec. 22, 1999, now U.S. Pat. No. 6,250,759, entitled "Eyeglass Lens with Multiple Optical Zones Having Varying Optical Properties for Enhanced Visualization of Different Scenes in Outdoor Recreation Activities".

BACKGROUND OF THE INVENTION

The present invention relates generally to wearable optics for outdoor sporting and recreational activities. More particularly, this invention relates to eyeglass lenses having optical properties optimized for outdoor sporting and recreational activities.

In many sporting or recreational activities, such as tennis, skiing, golfing, fishing, or hunting, the participant needs to visualize different scenes, including target objects within such scenes, that are typically associated with that activity. The color spectra and ambient lighting associated with different target objects and scenes in recreational activities can vary, whereby a light filtering lens on an eyeglass should provide preferential viewing for certain color spectra under certain light intensity conditions to accommodate a specific scene typically encountered while participating in the activity. Using golf as an example, a scene whereby the shapes and undulations of a green putting surface being studied while preparing to putt would require different filtering properties for the lens as compared to watching a white ball flying through the air against a bright sky background. Although sunglasses exist that provide a variation in total light transmittance from a top portion of the lens to the bottom portion, such prior art lenses are often configured as standard neutral density filters with UV protection. They do not provide varying optical properties that provide preferential viewing to the wearer of the different color spectra associated with different scenes.

Similarly, these different target objects or scenes often exist at distances that vary between scenes or objects in a relatively consistent manner. For example, during a round of golf, the golfer will often have to locate a target green and flag stick at distances from 200–350 yards away. During that same round, the same golfer will be putting after inspecting the shape and topology of a green from a distance of a few yards. If the golfer wears glasses, the focus distances for each of the repetitive scenes are different. However, there are no eyeglasses available that are optimized for focusing at these distances. Conventional bifocals are intended to provide near focus distance for reading a book, not for reading a green or standing over a golf ball.

In other recreational activities such as fishing, having a lens that incorporates different optical zones having different polarization properties can also be beneficial.

In other sports such as tennis, for another example, it may be desirable to view the same object (a moving tennis ball) at two different distances from the player, with eyeglasses having different optical zones with different optical properties optimized for visualizing the moving ball or other object at different distances.

What is needed, then, is an eyeglass lens that provides a visual perception to the wearer that can vary depending on: (1) the distance between the wearer and the object being viewed; (2) the color spectra of the viewed objects and related foreground and background scenes; (3) the ambient lighting conditions; and/or light polarization.

SUMMARY OF THE INVENTION

The novel eyeglass lens of this invention overcomes the deficiencies of the prior art by providing a lens body that includes one or more optical zones having one or more optical properties optimized for use in specific sporting and/or outdoor activities. The different optical zones are positioned within or on the body of the lens such that changes in orientation of the head, or a change in position or size of the pupil of the wearer's eye with respect to the lens and different scenes (including target objects) can vary the optical properties of the lens as perceived by the wearer, including focus distance, total visible light transmittance, visible light transmission spectrum, and/or polarization.

In one embodiment of the invention, an eyeglass lens has a lens body with a first optical zone positioned in an upper portion of the lens body, adjacent to a second optical zone positioned in a lower portion of the lens body. The first optical zone has a first focus property that allows the wearer to preferentially view a second typical distant scene associated with golf, such as a locating the green and flagstick prior to driving or hitting a long iron off the fairway. The second optical zone has a second focus property that allows the wearer to preferentially view a first typical close-in scene associated with a specific recreational activity, such as observing the shapes and curves of a golf green while putting. When the user (i.e., a golfer) is preparing to drive, he typically will rotate his eyes upward to look down the fairway towards the target area. This eye movement will orient the pupil of the eye so that most of the light reflected from the distant target scene will pass through the upper or first optical zone. When putting or preparing to putt, or when addressing the ball to drive, the golfer will typically reposition the pupil of the eye downward so that a greater percentage of the light reflected from the close-in scene will pass through the lower, second optical zone. This will allow the golfer to more precisely focus on objects and backgrounds in such a close-in scene.

Further, the first and second optical zones can also have different color filtering properties, i.e., different visible light transmission spectra. The transmission spectra for the first optical zone can be optimized so that a white golf ball in flight against a brightly lit sky background is easier to see. The color filter property of the second optical zone can be optimized so that changes in the shape or slope of the putting green when viewed from a close in location and under lower intensity light are more easily observed. The differences in color filter properties between the first and second filter zones thus can include variations in filter spectra as well as variations in total light transmittance through that portion of the lens. Accordingly, as the golfer's eyes change orientation as they are rotated up and down with respect to the position of the lens, the arrangement of the first and second optical zones provides both a focus property and a color filter property that are optimized for different scenes, including specific objects, backgrounds, and foregrounds.

In another embodiment of the invention, the eyeglasses have zones optimized for tracking a moving object, such as while playing tennis. At a distance, the tennis ball appears smaller and so identifying the location (and direction of travel) of the ball against other backgrounds is important. The inventors' U.S. Pat. No. 5,592,245, which is incorporated herein in its entirety by reference, defines a lens that highlights the optic yellow colored tennis ball against most other background colors. This would preferably define the characteristics of the upper or first optical zone. As the ball approaches the tennis player, visual acuity is critical and the ability to accurately visualize the fast moving ball very important. "Shooter's yellow" and other variations of yellow, amber, orange or red improve visual acuity. Therefore, the ball when close to the player is seen through the lower or second optical zone of the lens.

The different optical zones in the lens can be arranged in a typical bifocal fashion, with an abrupt line or gradual transition between an upper and a lower zone. Alternatively, the second optical zone can be an oval or circle positioned in a specific location within the lens body.

DESCRIPTION OF THE PREFERRED EMBODIMENTS

Figure 1:
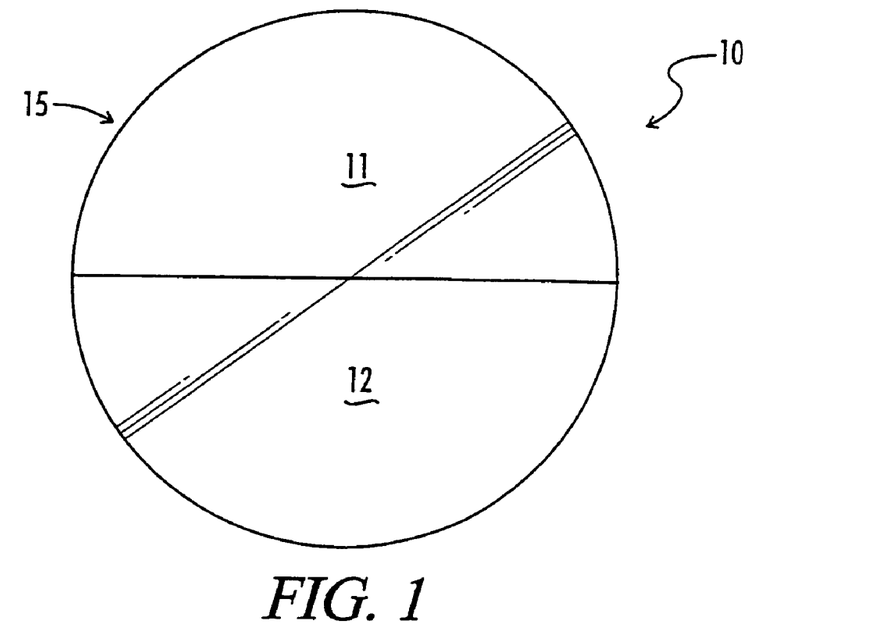
FIG. 1 is a plan view of a first embodiment of the lens of the present invention having a lens body with an over and under arrangement of first and second optical zones having a step transition in optical properties.

Referring to FIG. 1, a first embodiment of an eyeglass lens 10 includes a conventionally shaped lens body 15 having a first optical zone 11 located in an upper portion of the lens body 15. The first optical zone 11 is provided with one or more optical properties to allow a wearer of the lens 10 to preferentially view a first typical scene (including objects, backgrounds, and/or foregrounds) associated with a specific outdoor recreational activity, such as tennis, skiing, golf, hunting, or fishing. Thus, the first optical zone 11 can be clear or can be treated with a dye or interference coating to provide desired parameters for transmission percentage and transmission spectrum properties for light at various visible wavelengths. Similarly, the first optical zone 11 can be manufactured in a conventional manner to provide ideal focus at a distance range associated with the first typical scene. For example, the first optical zone 11 can provide optimum focus for targeting a flagstick on a golf green located 200 yards from the wearer, and can provide color light filtering that provides preferential viewing of a white golf ball against a bright sky background, as shown in FIG. 7.

Figure 4:
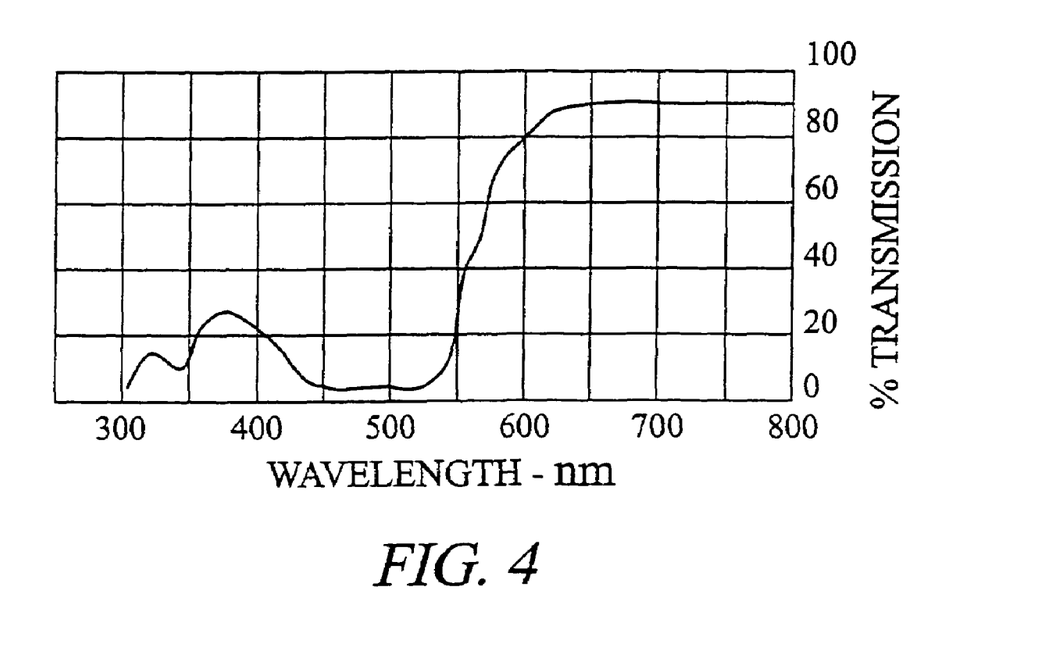
FIG. 4 is a graph showing visible light transmittance and visible light transmission spectrum properties for an amber tinted filter used in the second optical zone in a lens of the invention as shown in FIG. 1, optimized for putting a golf ball on a green putting surface.

Located immediately below the first optical zone 11 is a second optical zone 12 that provides preferential viewing of a second typical scene associated with the same recreational activity. For example, the second optical zone 12 can be manufactured in a conventional manner to provide optimum focusing at short range, such as the distance to a golf ball during address for putting or driving. The second optical zone 12 is also provided with different parameters for transmission percentage and transmission spectrum properties to transmit a greater percentage of the total visible light as compared to the first optical zone 11, and for filtering certain visible wavelengths, as shown in FIG. 4, to preferentially view the shapes and undulations of a putting green. Accordingly, as the wearer of the eyeglasses equipped with the lens 10 rotates the pupils of his eyes upward and downward to observe the different scenes typically encountered during a specific recreational activity, the pupils of the wearer's eyes are visually aligned with the first or second optical zone that provides enhanced visualization of two or more different scenes associated with that activity.

Figure 7:
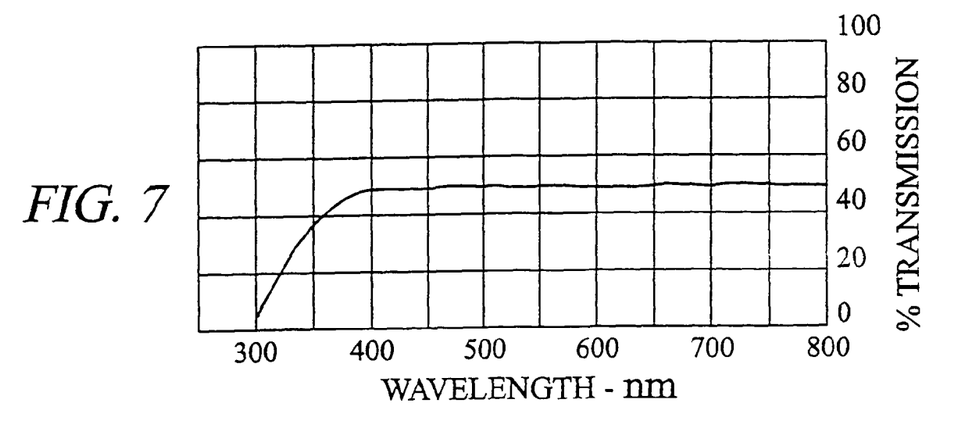
FIG. 7 is a graph showing visible light transmittance and visible light transmission spectrum properties for a neutral density filter with UV protection as used in the first optical zone in a lens of the invention as shown in FIG. 1.

FIGS. 1, 4, and 7 illustrate an embodiment of the lens of this invention that is adapted for enhanced visualization of different scenes associated with golf. The first optical zone 11 is located in the upper portion of the lens body 15, corresponding to the portion used for distant vision. As shown in FIG. 7, the transmission percentage and transmission spectrum properties for the first optical zone 11 approximately define a neutral density sunglass filter, gray in color, and having a total light transmission percentage that is substantially less than 100% and approximately constant over the visible wavelengths. Preferably, the transmission percentage decreases substantially as shown in FIG. 7 for light having wavelengths less than 400 nm, to provide UV protection. The second optical zone 12 is located in a lower portion of the lens body 15, corresponding to the portion of the lens body 15 through which closer scenes are viewed, particularly when the golfer is looking downward when studying a green or striking the ball. The parameters for the transmission percentage and transmission spectrum properties in the second optical zone 12 are selected to provide enhanced visualization of the shapes and contours of a green putting surface. As shown in FIG. 4, an amber (or cinnamon) tinted sunglass filter can provide this effect. Thus, the first (upper) optical zone 11 with a neutral density filter provides an excellent sunglass function with enhanced visualization of a white golf ball against a blue or a gray sky. Also, by using a neutral density filter, changes in distance perception are minimized, which can occur when using colored filters. The amber tinted filter forming the second optical zone 12 at the bottom of the lens body 15 comes primarily into use when the golfer is looking downward at the green for putting. An amber tinted filter increases perception of the curves and contours of the green or putting surface. Optionally, the parameters for the focus distance property can be varied in a step transition between the first and second optical zones 11 and 12, corresponding to the typical distances from the golfer to the backgrounds and objects associated with the different golfing scenes.

Figure 5:
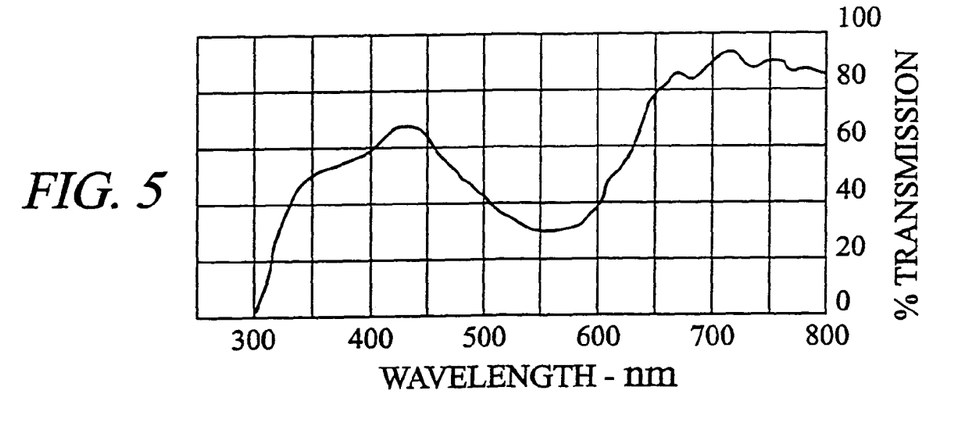
FIG. 5 is a graph showing visible light transmittance and visible light transmission spectrum properties for an lavender tinted filter used in the second optical zone in a lens of the invention as shown in FIG. 1, optimized for hunting.

A lens optimized for use in hunting glasses is shown in FIGS. 1, 5, and 7. Again, the first optical zone 11 in the upper portion of the lens body 15 provides a neutral density (approximately gray) filter (FIG. 7), and functions as a conventional sunglass without tinting of the background that can alter distance perception. Proper distance perception is important in hunting when aiming a gun or bow at distant objects. The second optical zone 12 in a lower portion of the lens body 15 is provided with transmission percentage and transmission spectrum property parameters that enhance visual perception of red colored objects against different backgrounds. A lavender tinted filter having the transmission spectrum graphed in FIG. 5 can provide this enhancement. The transmission percentage increases to a relatively high level for light having wavelengths between 650 and 710 nm, the wavelengths that correspond to red colors. The filter in the second optical zone 12 attenuates orange, yellow and green wavelengths but provides a transmission peak in the blue region as shown in FIG. 7. The combination of red and blue tints creates a lavender tint as perceived by the user, but wavelengths corresponding to red are transmitted, and stand out against the lavender background. Such a combination of optical properties is useful in tracking a wounded animal, in that while looking downward (through the second optical zone 12 in the lower portion of the lens body 15) blood drops are more clearly discerned. Again, the first and second optical zones 11 and 12 can be provided with different focus distance parameters, for focusing on objects at longer and shorter distances respectively.

Figure 6:
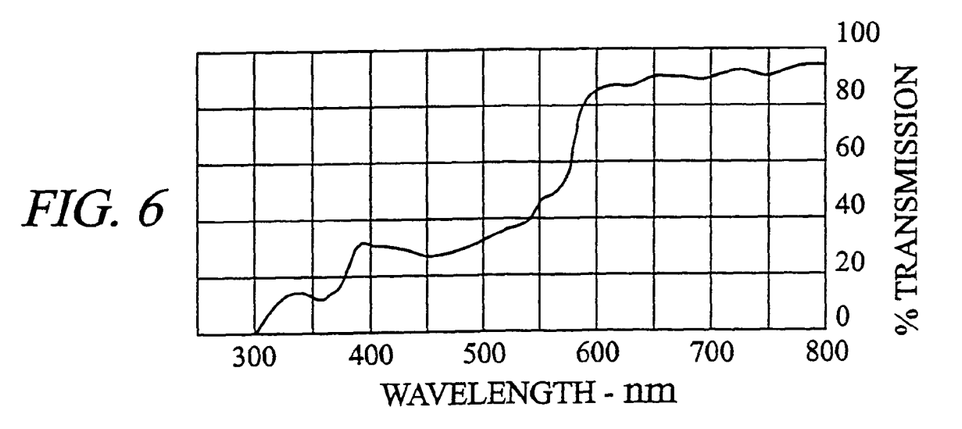
FIG. 6 is a graph showing visible light transmittance and visible light transmission spectrum properties for an orange tinted filter used in the second optical zone in a lens of the invention as shown in FIG. 1, optimized for fishing.

Yet another embodiment of the lens 10 is shown in FIGS. 1, 6, and 7, for enhanced visualization of different scenes encountered while fishing. The first optical zone 11 in the upper portion of the lens body 15 has neutral density (gray) transmission percentage and transmission spectrum parameters shown in FIG. 7 or is provided with another color tint to create a useful sunglass effect when viewing objects at a distance. Optionally, the first optical zone 11 is not polarized so that reflections from wave tops on the surface of the water being fished are not diminished. This can be important when the user is looking for ripples and surface reflections that may indicate the presence of schools of fish below the surface. The second optical zone 12 in the lower portion of the lens body 15 provides different optical property parameters that enhance visualization of objects at short range and beneath the water. This enables the fisherman to better "see" the fish or other submerged objects. A filter with an orange tint, with visible light transmission percentages and spectrum parameters such as that shown in FIG. 6 enhances the visualization of objects submerged in water. Also, the second optical zone 12 can be conventionally polarized with a polarization orientation that will reduce surface reflections and enable the fisherman to see objects beneath the surface of water at close range.

Figure 2:
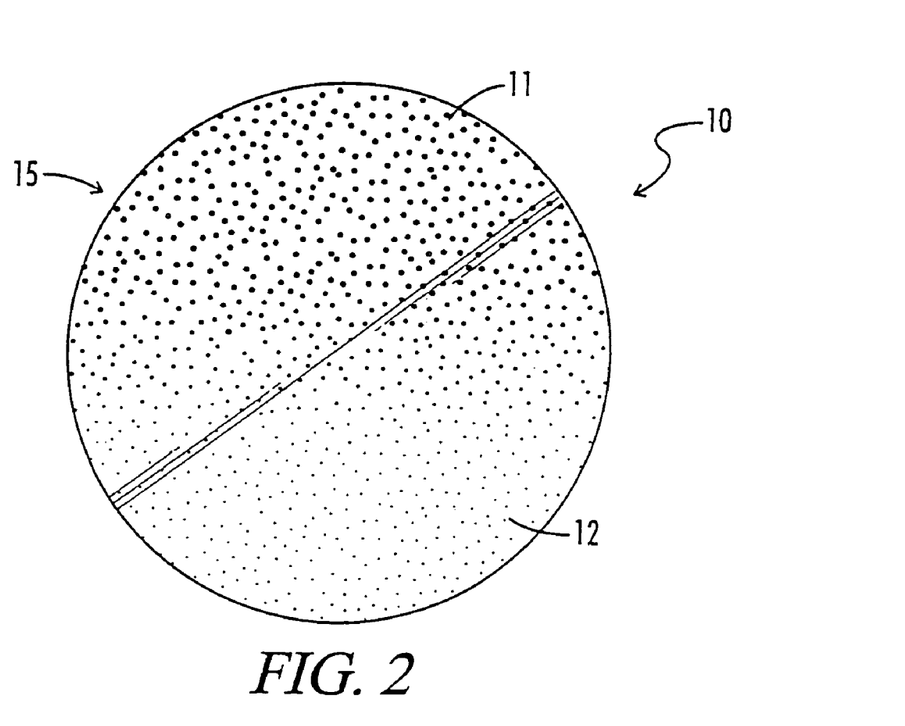
FIG. 2 is a plan view of a second embodiment of the invention in which there is a gradual transition in optical properties between the upper and lower optical zones.

FIG. 2 shows an embodiment of the lens 10 of this invention in which there is gradual transition in parameters associated with one or more optical properties, rather than a step or line transition as shown in FIG. 1. For example, the lens 10 shown in FIG. 2 can have a transmission percentage of total visible light that gradually increases from the top to the bottom of the lens body 15, with a corresponding gradual change in color tint, such as from a neutral density filter as in FIG. 7 to an amber tinted filter as shown in FIG. 4. Thus, a lens 10 of this invention with a gradual transition as shown in FIG. 2 essentially defines multiple optical zones. A similar effect can be provided in an embodiment having three or more adjacent optical zones with line or step transitions in optical property parameters between them.

Figure 3:
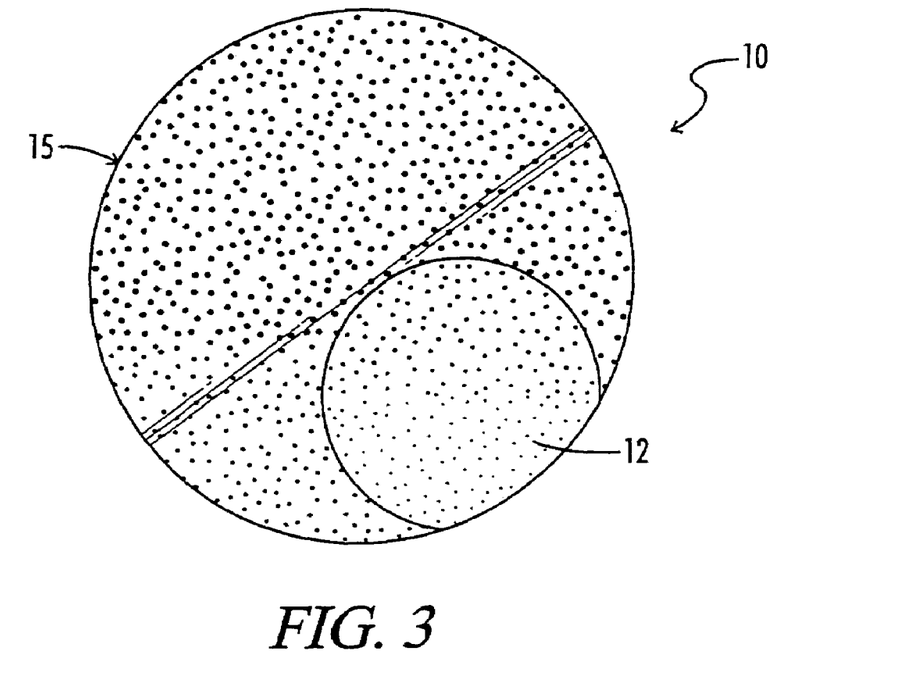
FIG. 3 is a plan view of a third embodiment of the invention in which the second optical zone is positioned in a specific location within the lens body, partially surrounded by the first optical zone.

FIG. 3 illustrates yet another embodiment of the lens 10 in which second optical zone 12 is smaller as compared to the first optical zone 11 that surrounds it and is positioned in a lower, inside corner of the lens body 15. Of course, the different optical zones can be sized, shaped, and positioned on the lens body 15 in a variety of ways not illustrated here, for purposes of providing enhanced visualization of specific scenes associated with specific recreational activities.

As mentioned above, one of the optical properties having parameters that can be changed between optical zones for enhanced visualization of certain scenes (including target objects within the scenes) associated with a specific recreational activity is focus distance. In some cases, it may be beneficial to optimize the focus distance of each optical zone to correspond to the needs of a particular wearer in addition to the requirements of the specific scenes. For example, magnification can be provided in one or more optical zones.

Figure 8:
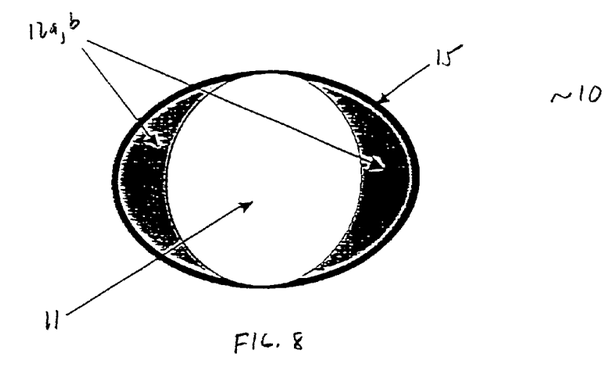
FIG. 8 is a plan view of another embodiment of the lens of the invention in which there are multiple optical zones arranged horizontally across the left side, center, and right side of the lens.

FIG. 8 illustrates yet another embodiment of the lens 10 in which the first optical zone 11 is positioned in a central region of the lens body 15, with second optical zones 12*a* and 12*b* positioned along the left and right outer margins of the lens body 15. The first optical zone 11 is provided with a tint density that is transmits a higher percentage of light as compared to the more darkly tinted second optical zones 12*a* and 12*b*. This decreases the average transmission of visible light on the left and right portions of the lens 10 as compared to the central region. In activities such as golf, there are situations and scenes where directing the eyes forward to the center of the scene while reducing peripheral distractions would be beneficial. Conventionally, a participant in such an activity might cup his or her hands around the face, shielding the eyes from light arriving peripherally. This embodiment of the lens 10 accomplishes the same result in a more controlled manner.

Figure 9:
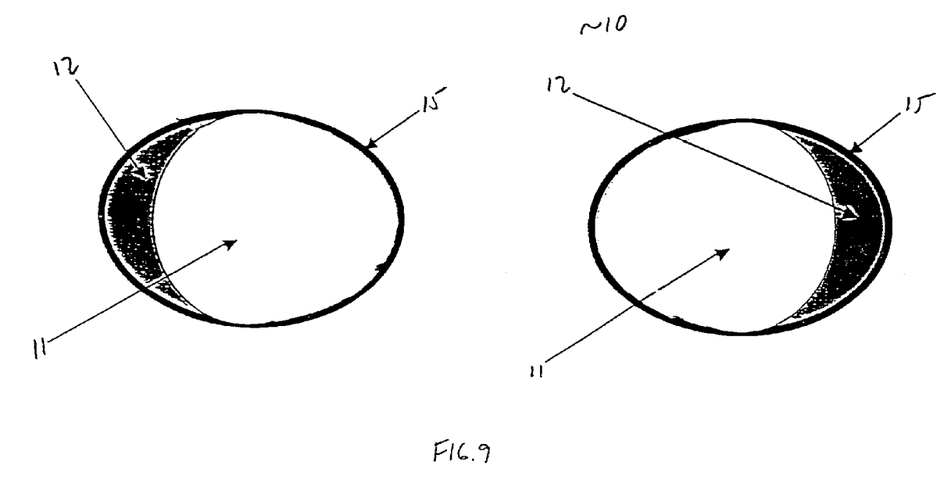
FIG. 9 is a plan view of yet another embodiment of the invention in which there is are multiple optical zones arranged horizontally across the outer and central portions of a pair of lenses.

A similar result can be achieved as shown in the horizontal optical zone arrangement of FIG. 9, showing a pair of lens bodies 15 where the first optical zone 11 occupies the central and inner portions of the lens body 15, with a second optical zone 12 on the respective outer portions of the lens body. Note that the horizontally arranged optical zones as shown in FIGS. 8 and 9 can also be provided with other optical parameters that vary from the first to second optical zones 11 and 12*a* and 12*b*, such as tint color, focus, or polarization. In fact, the first optical zones 11 can be clear with tinting only of the second optical zones 12. Also, the horizontally arranged optical zones 11, 12*a* and 12*b*, can be combined with the vertically aligned zones described above.

In another variation of the embodiments of the lens 10 described above, viewing of scenes associated with certain recreational activities such as tennis., skiing, golf, fishing, and hunting can also be enhanced where the first optical zone 11 in the lens body 15 is provided with a blue or blue-gray tint rather than a simple neutral density filter (gray tint). Similarly, for activities such as tennis, skiing, golf or fishing, the second optical zone 12 can enhance visualization of certain scenes if the lens is provided with an orange, amber, yellow, or red tint. Thus, a lens manufactured in accordance with the present invention will have a first optical zone 11 having a percentage of light transmission that is approximately constant with wavelength (corresponding to a gray tint) or will transmit a higher average percentage of the shorter wavelength visible light (corresponding to a blue or blue-gray tint). The second optical zone 12, by comparison, will transmit a higher average percentage of the longer wavelength visible light (corresponding to an amber, orange, yellow, or red tint).

In yet another embodiment of the lens 10 that is useful for ski glasses or goggles, the first optical zone 11 located on the upper portion of the lens/goggle body 15 is tinted gray, blue or blue-gray and the second optical zone 12 in the lower portion of the lens/goggle body 15 is tinted amber, vermilion, or orange. The amber or vermilion tinted second (lower) optical zone 12 aids in the visualization of the contours of snow on the ground that is viewed at close range while the neutral or blue tinted first (upper) optical zone 11 is preferred for distance viewing.

In another embodiment of the lens 10 that is optimized for playing tennis, the first optical zone 11 located in the upper portion of the lens body 15 has a bluish, teal, or blue-green tint. This can be accomplished in one embodiment by providing an optical zone in which the transmittance has a pronounced peak of transmittance that is centered substantially around 500 to 525 nanometers. On each side of the peak is a wave length at which transmittance is fifty percent of the peak transmittance. The range of wavelengths between these two fifty percent of peak transmittance points will be referred to herein as the bandwidth of the peak. The bandwidth of the peak transmittance substantially correlates with or overlaps the bandwidth of the peaks of light reflected and fluoresced by an optical yellow tennis ball. It is preferred that the bandwidths of the peaks of reflectance and florescence of the tennis ball substantially overlap by at least one-half the bandwidth of the peak of transmittance. The transmittance of the upper zone in the lens rolls-off rather sharply on each side of its peak, approaching zero toward the limits of the visible spectrum in each direction. Consequently, the upper zone 11 in the lens attenuates light not associated with the tennis ball significantly more than the intensity of the light emitted and reflected by the tennis ball. Thus, the lens will tend to enhance perception of the tennis ball against a background that reflects or emits light relatively uniformly across the visual spectrum or predominantly in parts of the visual spectrum outside the peaks of reflectance and florescence of the tennis ball.

In tennis, as in most other activities, it is desirable to view at least some of the background. Therefore the remainder of the visible spectrum, outside the peak is not completely attenuated. Furthermore, as tennis is often played out-of-doors, in the intense sunlight, the lens attenuates to a lesser degree light within the peak range to protect the eyes of the participant or observer from the sun.

To further enhance perception of the tennis ball, the transmittance of upper zone 11 rolls off significantly more rapidly on the red side of the curve than on the blue side of the curve and falls to near zero on the red side. Transmittance in the blue region remains greater than zero and therefore the background viewed through this filter has, in general, a bluish tint. A yellow tennis ball actually reflects a significant amount of red colored light, though not with quite the intensity of light within the green-yellow region of spectrum. Reducing the transmittance in the red region of the spectrum tends to emphasize the predominant yellow-green color of the ball while removing orange and lower wavelengths associated primarily with the background, thus further enhancing perception of the tennis ball while maintaining sufficient transmittance of other parts of the visible spectrum to reasonably view the background. One example of a suitable optical filter for this first or upper optical zone in the lens is a thin film, polycarbonate filter, manufactured and distributed under the name Lee Filters by Lee Panavision International, Inc., of Andover, Hampshire, England, and designated "Peacock Blue", No. HT-115. Also in accordance with the embodiment of the invention for visualizing a moving object, such as a tennis ball, the lower or second optical zone 12 of the lens is "shooter's yellow" in tint, or a variation including orange, red, or amber, to improve short distance visual acuity.

The embodiment described for playing tennis can be used for other recreational activities where viewing a target object having a target wavelength is beneficial. Accordingly, the lens 10 will have an upper optical zone 11 defining a an upper optical filter for attenuating light at wavelengths outside a filter spectrum such that the filter spectrum is broader than the target spectrum and narrower than the visible spectrum. The filter spectrum has upper and lower edges defined by wavelengths where light in the visible spectrum outside the upper and lower edges is substantially attenuated as compared to a center portion of the filter spectrum. The upper optical filter will then have a color tint visible to the user. Preferably, the target spectrum for the target object will include a spectrum of wavelengths of light which emanate from the target object to define a true color of the object. However, the target spectrum corresponds to a relatively narrow portion of the visible light spectrum of wavelengths. The target spectrum is further defined by at least one target wavelength which corresponds to a point within the target spectrum of peak light intensity, with light intensity within the target spectrum both above and below the target wavelength being of decreased intensity compared to the target wavelength. The upper optical filter further attenuates light such that the target wavelength is within the filter spectrum and proximate either the upper or lower edge of the filter spectrum so that the target object is perceived by the user as having its substantially true color, while background objects are perceived as having a contrasting color which is substantially the same as the color tint of the upper optical filter. These filter characteristics are generally illustrated and described in Applicant's U.S. Pat. No. 5,592,245, which is incorporated herein in its entirety by reference. The lens 10 of this embodiment has a lower optical zone 12 defining a filter that transmits a higher average percentage of visible light in the longer wavelengths as compared to the shorter wavelengths, giving the lens in the second zone an amber, orange, yellow or red tint.

Those of skill in the art will recognize that lenses manufactured in accordance with the objects of this invention can include standard protection against UV light, by substantially reducing the percentage of light transmitted at wavelengths known to cause UV damage, such as wavelengths that are shorter than visible blue light.

Thus, although there have been described particular embodiments of the present invention of a new and useful Eyeglass Lens With Multiple Optical Zones Having Varying Optical Properties for Enhanced Visualization of Different Scenes in Outdoor Recreational Activities, it is not intended that such references be construed as limitations upon the scope of this invention except as set forth in the following claims.

What is claimed is:

1. Eyeglasses worn over each eye of a user during a specific recreational activity comprising:

a. at least one lens body;

b. the lens body having at least first and second light transmissive optical zones, with each optical zone provided with one or more optical properties having parameters that vary from the first optical zone to the second the optical zone; and
c. the variations in the parameters for the optical properties from the first to the second optical zones being pre-defined with filters for enhancing visualization of two or more different scenes associated with a specific recreational activity;
d. wherein the parameters for the transmission spectrum and transmission percentage optical properties in the first optical zone define a filter having a blue, blue-green, or teal tint to enhance visualization of at least one scene associated with the specific recreational activity and the parameters for the transmission spectrum and transmission percentage optical properties in the second optical zone define a filter having an amber, orange, yellow, or red tint to enhance visualization of at least a second and different scene associated with the specific recreational activity; and
e. wherein each of the first and second optical zones are worn over each eye of the user and are in substantially the same position relative to each eye of the user.

2. The eyeglasses of claim 1 wherein the recreational activity is tennis using a yellow-green tennis ball having a target wavelength which falls within a range of 510–540 nm and wherein the filter in the first optical zone provides a reduced attenuation of light at wavelengths which are shorter than the target wavelength as compared to attenuation of light having wavelengths which are longer than the target wavelength such that light at wavelengths between 400 nm and the target wavelength are substantially transmitted as compared to light at wavelengths greater than the target wavelength.

3. A lens for glasses worn over the eye of a user during a specific recreational activity comprising:
a. a lens body;
b. the lens body having an upper optical zone defining a filter having a blue, blue-green, or teal tint, the filter optimized for visualizing a distant moving object; and
c. the lens body having a lower optical zone defining a filter having an amber, orange, yellow, or red tint, the filter optimized for visualizing the moving object at close range.

4. The lens of claim 3 wherein the moving object is a yellow-green tennis ball having a target wavelength which falls within a range of 510–540 nm and wherein the filter in the upper optical zone provides a reduced attenuation of light at wavelengths which are shorter than the target wavelength as compared to attenuation of light having wavelengths which are longer than the target wavelength such that light at wavelengths between 400 nm and the target wavelength are substantially transmitted as compared to light at wavelengths greater than the target wavelength.

5. Eyeglasses worn over each eye of a user during a specific recreational activity comprising:
a. at least one lens body;
b. the lens body having an upper optical zone defining a filter having a blue, blue-green, or teal tint;
c. the lens body having a lower optical zone defining a filter that transmits a higher average percentage of visible light in the longer wavelengths as compared to the shorter wavelengths, giving the lens in the lower optical zone an amber, orange, yellow or red appearance;
d. wherein the upper optical zone is positioned in an upper portion of the lens body over each eye such that when the user is looking ahead or upward at a first scene associated with a specific recreational activity, the pupil of each of the user's eyes is primarily visually aligned with the upper optical zone; and
e. wherein the lower optical zone is positioned in a lower portion of the lens body over each eye such that when the user is looking downward at a second scene associated with the specific recreational activity, the pupil of each of the user's eyes is primarily visually aligned with the lower optical zone.

6. The eyeglasses of claim 5 wherein the recreational activity is tennis using a yellow-green tennis ball having a target wavelength which falls within a range of 510–540 nm and wherein the filter in the upper optical zone provides a reduced attenuation of light at wavelengths which are shorter than the target wavelength as compared to attenuation of light having wavelengths which are longer than the target wavelength such that light at wavelengths between 400 nm and the target wavelength are substantially transmitted as compared to light at wavelengths greater than the target wavelength.

7. Eyeglasses worn over each eye of a user during a specific recreational activity comprising:
a. at least one lens body;
b. the lens body having an upper optical zone defining an upper optical filter for attenuating light at wavelengths outside a filter spectrum such that the filter spectrum is broader than a target spectrum and narrower than the visible spectrum, and whereby the filter spectrum has upper and lower edges defined by wavelengths where light in the visible spectrum outside the upper and lower edges is substantially attenuated as compared to a center portion of the filter spectrum, the upper optical filter having a color tint visible to the user;
c. the target spectrum comprising a spectrum of wavelengths of light which emanate from the target object to define a true color of the object, the target spectrum corresponding to a relatively narrow portion of the visible light spectrum of wavelengths, and wherein the target spectrum is further defined by at least one target wavelength which corresponds to a point within the target spectrum of peak light intensity, with light intensity within the target spectrum both above and below the target wavelength being of decreased intensity compared to the target wavelength;
d. the upper optical filter further attenuating light such that the target wavelength is within the filter spectrum and proximate either the upper or lower edge of the filter spectrum whereby the target object is perceived by the user as having its substantially true color and background objects are perceived as having a contrasting color which is substantially the same as the color tint of the upper optical filter;
e. the lens body having a lower optical zone defining a filter that transmits a higher average percentage of visible light in the longer wavelengths as compared to the shorter wavelengths, giving the lens in the second zone an amber, orange, yellow or red appearance; and
f. wherein each of the upper and lower optical zones are worn over the eye of the user and are in substantially the same position relative to each eye of the user.

* * * * *